(12) United States Patent
Morita et al.

(10) Patent No.: US 6,333,828 B1
(45) Date of Patent: Dec. 25, 2001

(54) MAGNETIC DISK UNIT WITH SLIDER SUSPENSION ASSEMBLIES AND HEAD IC CHIPS

(75) Inventors: Haruyuki Morita; Masanori Sakai; Ken-ichi Takano, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/285,697

(22) Filed: Apr. 5, 1999

(30) Foreign Application Priority Data

Apr. 13, 1998 (JP) .................................................. 10-115916

(51) Int. Cl.$^7$ ...................................................... G11B 5/02
(52) U.S. Cl. ................................................. 360/68; 360/46
(58) Field of Search ............................... 360/46, 68, 104; 327/110

(56) References Cited

U.S. PATENT DOCUMENTS

| | | | |
|---|---|---|---|
| 5,910,861 | * 6/1999 | Ahn | 360/46 |
| 5,920,447 | * 7/1999 | Sakata et al. | 360/121 |
| 6,014,289 | * 1/2000 | Goss | 360/104 |
| 6,025,988 | * 2/2000 | Yan | 361/685 |
| 6,084,746 | * 7/2000 | Shiraishi et al. | 360/104 |
| 6,118,602 | * 9/2000 | De La Soujeole | 360/46 |

FOREIGN PATENT DOCUMENTS

| | | |
|---|---|---|
| 53-69623 | 6/1978 | (JP) . |
| 6-70848 | 9/1994 | (JP) . |

* cited by examiner

*Primary Examiner*—Regina Y. Neal
(74) *Attorney, Agent, or Firm*—Arent Fox Kintner Plotkin & Kahn, PLLC (57) ABSTRACT

A magnetic disk unit includes slider suspension assemblies, each of the assemblies having a slider with at least one magnetic head element and a suspension with one end portion and one surface, the slider being mounted on the one surface of the suspension at the one end portion, magnetic disks, each of the disks having at least one surface which opposes to the slider of the assembly, head IC chips electrically connected to the magnetic head elements, and a control circuit electrically connected with the head IC chips. The control circuit controls operations of each of the magnetic head elements so that the write current is applied to the magnetic head element for a first predetermined period of time and then the application of the write current to the magnetic head element is stopped for a second predetermined period of time which is equal to or longer than the first predetermined period.

11 Claims, 8 Drawing Sheets

MAGNETIC DISK UNIT WITH SLIDER SUSPENSION ASSEMBLIES AND HEAD IC CHIPS

FIELD OF THE INVENTION

The present invention relates to a magnetic disk unit including magnetic disks, slider suspension assemblies each of which has a slider with at least one thin-film magnetic head element and a resilient suspension for supporting the slider, and head IC chips.

DESCRIPTION OF THE RELATED ART

In such magnetic disk unit, thin-film magnetic head elements for writing magnetic information into and/or reading magnetic information from magnetic hard disks are in general formed on the sliders flying in operation above surfaces of the respective magnetic disks. Each slider is supported by a suspension made of a resilient thin metal plate extended from one end of a movable arm in the magnetic disk unit.

Head IC chips are used for amplifying write current to the magnetic head elements, for amplifying read current from the magnetic head elements and for controlling the write and read operations of the magnetic head elements. Each head IC chip had been mounted on the movable arm located in a rearward position of the suspension or on a flexible printed cable (FPC) also located at a rearward position of the suspension. However, if the head IC chip is mounted on the movable arm or on the FPC, lead lines for electrically connecting the magnetic head element with the IC chip become long causing noises to be easily generated. Also, the long lead lines provide some delay in rising and falling times of pulse signals due to parasitic capacitance and inductance of these lead lines causing the high rate transfer of data to make difficult.

In order to suppress the generation of noises from the lead lines, Japanese patent unexamined publications nos. 53(1978)-69623 and 3(1991)-108120 propose head suspension assemblies wherein the length of the lead lines is shortened by mounting the head IC chips on the sliders or on the suspensions.

However, if the IC chip is mounted on the slider or on the suspension, the IC chip itself is heated to a high temperature due to the write current flowing through the IC chip during recording operation. This generated heat from the head IC chip will exert an influence upon the magnetic head element. That is, when the head IC chip is mounted on the movable arm as in the conventional art, the temperature of the IC chip can be maintained at a low value because the movable arm has sufficient heat capacity and heat dissipation area. Furthermore, the magnetic head element will not receive the influence of the generated heat because the IC chip locates far from the magnetic head element. Whereas, when the IC chip is mounted on the slider or on the suspension, sufficient surface area for dissipating heat generated from the IC chip cannot be obtained and also the reduction of heat during heat conduction cannot be expected. Thus, the temperature of the IC chip itself increases causing a degree of reliability of the IC chip to lower and the magnetic head element will receive the influence of the generated heat.

SUMMARY OF THE INVENTION

It is therefore an object of the present invention to provide a magnetic disk unit with slider suspension assemblies and head IC chips, whereby increase in temperature of head IC chips can be effectively suppressed.

According to the present invention, a magnetic disk unit includes slider suspension assemblies, each of the assemblies having a slider with at least one magnetic head element and a suspension with one end portion and one surface, the slider being mounted on the one surface of the suspension at the one end portion, magnetic disks, each of the disks having at least one surface which opposes to the slider of the assembly, head IC chips electrically connected to the magnetic head elements, and a control circuit electrically connected with the head IC chips. The control circuit controls operations of each of the magnetic head elements so that the write current is applied to the magnetic head element for a first predetermined period of time and then the application of the write current to the magnetic head element is stopped for a second predetermined period of time which is equal to or longer than the first predetermined period.

The write current Is applied to the magnetic head element for a first predetermined period of time (predetermined write period) for example 3 msec to 1 sec, and just after the period, the application of the write current to the magnetic head element is forcibly stopped for a second predetermined period of time (predetermined write halt period) which is equal to or longer than the write period. The write current heats the head IC chip during the write period. However, during the write halt period which is not shorter than the write period, the write current is stopped from flowing even when there is data to be written to cool the head IC chip. Thus, temperature increasing of the head IC chip can be suppressed to a smaller extent.

It is preferred that the control circuit controls operations of the magnetic head element so that read operations of the magnetic head element is executed during the write halt period.

It is also preferred that the write period is determined by using a unit of time which substantially corresponds to one rotation of the magnetic disks.

Preferably, the control circuit controls the write and write halt periods with respect to the write current applied to the same magnetic head element.

Also preferably, the control circuit controls the write and write halt periods with respect to the write current applied to a plurality of the magnetic head elements. In this case, more preferably, the control circuit controls the write current applied to the magnetic head elements so that the write current is sequentially applied to each of the magnetic head elements for the write period.

It is preferred that the head IC chips are mounted at positions where air flow produced by rotation of the magnetic disks are always provided during operation. For example, the head IC chips may be mounted at positions within peripheral edges of the magnetic disks so as to oppose to surfaces of the magnetic disks, respectively. Alternately, the head IC chips may be mounted on connection line members such as FPCs for connecting the head IC chips with external circuits, respectively. Since airflow due to rotation of the magnetic disks pass near the head IC chips, the head IC chips are always cooled while the magnetic head elements seek above the surfaces of the magnetic disks. Thus, in addition to the aforementioned write halt control, the head IC chips can be effectively cooled to extremely reduce its temperature increasing.

In case that the head IC chips are mounted at positions within peripheral edges of the magnetic disks so as to oppose to surfaces of the magnetic disks, it is preferred that a distance between each of the head IC chips and each of the opposing surfaces of the magnetic disks is equal to or shorter than 1,000 μm. As a result, the airflow cooling due to disk rotation becomes very effective.

Further objects and advantages of the present invention will be apparent from the following description of the preferred embodiments of the invention as illustrated in the accompanying drawings.

DESCRIPTION OF THE PREFERRED EMBODIMENTS

Figure 1:
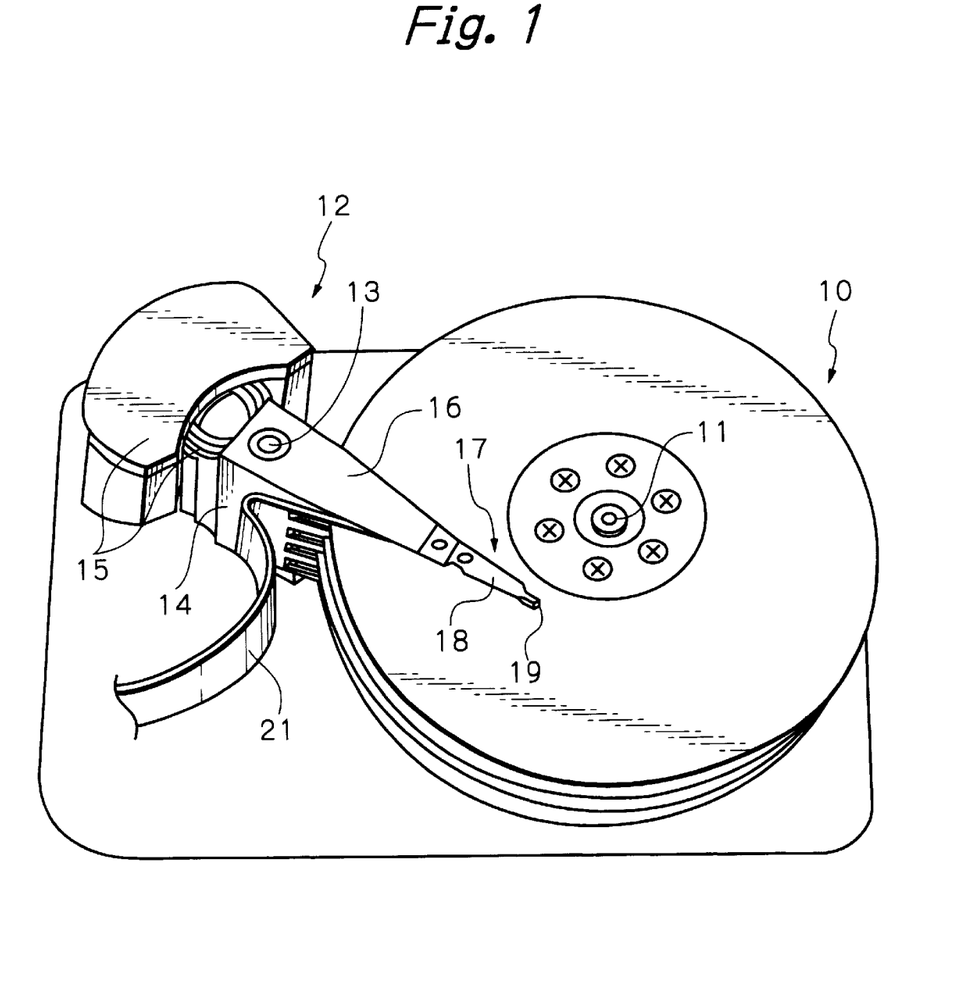
FIG. 1 is an oblique view illustrating main components of a magnetic disk unit of a preferred embodiment according to the present invention.
Figure 2:
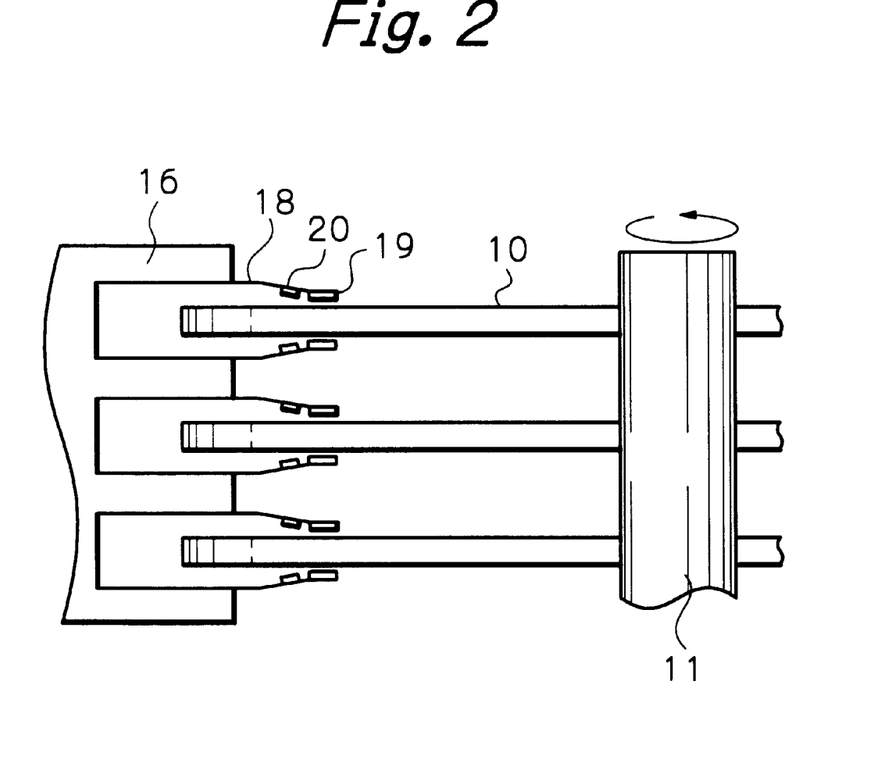
FIG. 2 is a side view illustrating the structure of an assembly carriage device in the magnetic disk unit shown in FIG. 1.

FIG. 1 illustrates main components of a magnetic disk unit of a preferred embodiment according to the present invention, and FIG. 2 illustrates the structure of an assembly carriage device in the magnetic disk unit shown in FIG. 1.

In these figures, reference numeral 10 denotes a plurality of magnetic hard disks rotating around an axis 11, and 12 denotes an assembly carriage device for positioning a magnetic head element on a track of the disk. The assembly carriage device 12 is mainly constituted by a carriage 14 capable of rotating around an axis 13 and an actuator 15 such as for example a voice coil motor (VCM) for driving the carriage 14 to rotate.

Base portions at one ends of a plurality of drive arms 16 are attached to the carriage 14, and one or two head suspension assemblies 17 are mounted on top portions at the other ends of the arms 16, respectively. Each of the head suspension assemblies 17 is assembled by fixing a slider 19 having a magnetic head element to a top end portion of a suspension 18, and by mounting a head IC chip 20 on a middle portion of this suspension 18. The slider 19 and the head IC chip 20 are fixed on a surface of the suspension 18, which opposes to one surface (recording and reproducing surface) of each of the magnetic disks 10. This surface of the suspension 18 is called hereinafter as a slider-attached surface.

In this embodiment, the head IC chip 20 is a bear chip and mounted on the suspension 18 by flip-chip bonding process.

Each of branched top end portions of a connection line member, a flexible printed cable (FPC), 21 reaches to each top portion of the drive arms 16 of the carriage 14. The other end of the FTC 21 is electrically connected to circuits in the magnetic disk unit.

Since the head IC chip 20 is mounted on the slider-attached surface of the suspension 18, airflow due to rotation of the magnetic disk 10 passes near the head IC chip 20. Thus, this head IC chip 20 is cooled to prevent its temperature from greatly increasing. Also, the temperature of the slider 18 is somewhat prevented from increasing.

Figure 3:
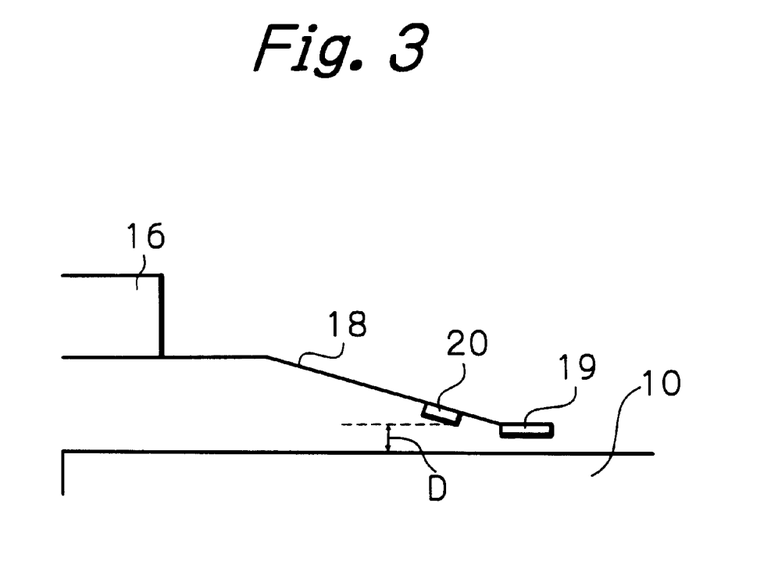
FIG. 3 illustrates a distance D between the surface of a magnetic disk and the head IC chip in the magnetic disk unit shown in FIG. 1.

In order that the head I chip 20 is effectively cooled by the air flow caused by the rotation of the magnetic disk 10, a distance D between the head IC chip 20 and the surface of the magnetic disk 10, which opposes to the head IC chip 20, shown in FIG. 3 should be shortened. The shorter in the distance D, the more effective cooling of the head IC chip 20 can be realized. However, the distance D should be determined so that, in operation, the head IC chip 20 or the slider 18 does not contact with the surface of the magnetic disk 10.

Figure 4:
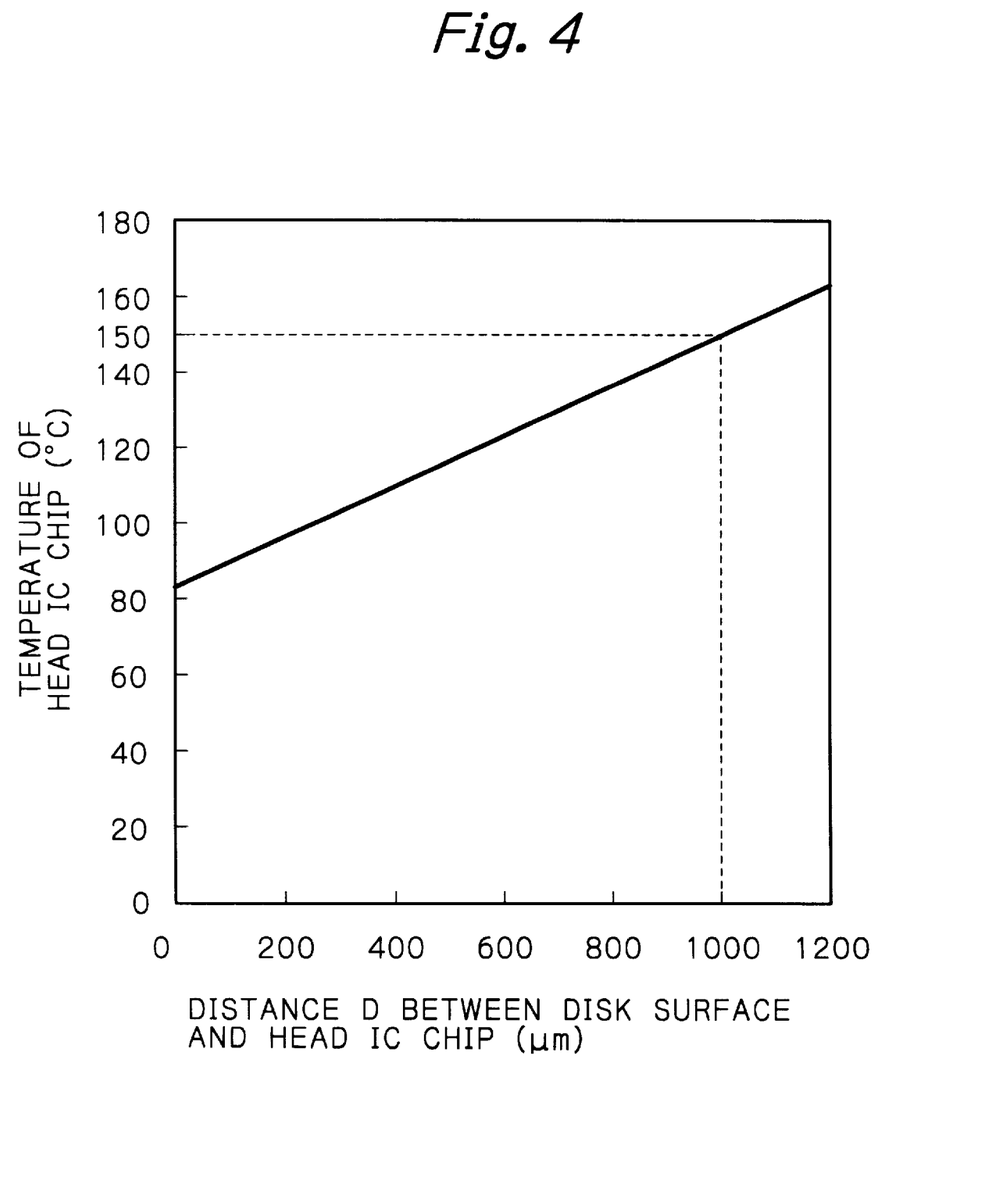
FIG. 4 is a graph illustrating temperature characteristics of the head IC chip versus the distance D between the surface of a magnetic disk and the head IC chip.

If the distance D is D≦1,000 μm, the temperature of the head IC chip 20 can be maintained at 150° C. or less even when continuous write current flows through the head IC chip 20. FIG. 4 illustrates measured temperature characteristics of the head IC chip 20 versus the distance D between the surface of the magnetic disk 10 and the head IC chip 20. Measurement of this temperature characteristics was done under an environment temperature of 50° C. which corresponds to the normal operation temperature in the magnetic disk unit and under application of the continuous write current of 40 mA. In general, the temperature at junctions of transistors in the head IC chip has to keep at 150° C. or less. If the IC chip is operated for a long time at higher temperature than 150° C. the junctions may be destroyed. Thus, in case of D≦1,000 μm, since the temperature of the head IC chip 20 is maintained at 150° C. or less even when continuous write current flows through the head IC chip 20 as shown in FIG. 4, no destruction of the IC chip 20 due to high temperature can be expected.

Figure 5:
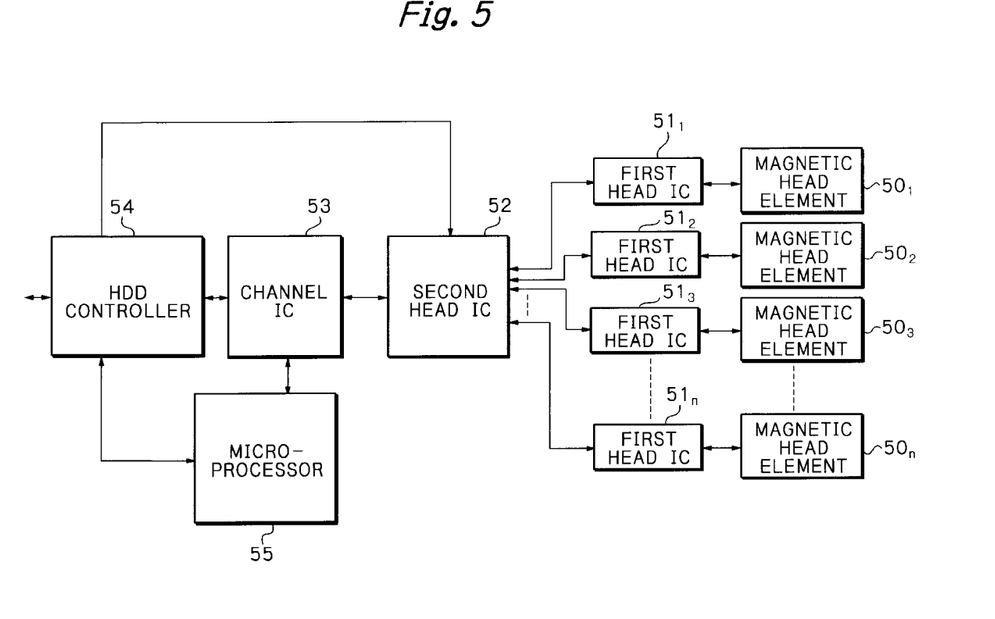
FIG. 5 is a block diagram illustrating an example of electrical structure of the magnetic disk unit shown in FIG. 1.

FIG. 5 illustrates an example of electrical structure of the magnetic disk unit in the embodiment shown in FIG. 1.

In the figure, reference numerals $50_1$–$50_n$ denote read and write magnetic head elements mounted on the respective head suspension assemblies 17, $51_1$–$51_n$ denote first head ICs mounted on the suspensions 18 of the respective head suspension assemblies 17 and connected to the respective magnetic head elements $50_1$–$50_n$, 52 denotes a second head IC connected to the first head ICs $51_1$–$51_n$ via the FPC 21, 53 denotes a channel IC mounted on a main board in the magnetic disk unit and connected to the second head IC 52, 54 denotes a HDD controller to be connected with external circuits via a bus and used for selection control of write/read modes of the magnetic head elements, and 55 denotes a microprocessor for controlling the above-mentioned circuits. Although it is not shown in FIG. 5, a spindle motor for rotating the magnetic disks 10, a driving control circuit of the spindle motor, a driving control circuit of the actuator or VCM 15, and memories are also mounted in the typical magnetic disk unit.

The first head ICs $51_1$–$51_n$ and the second head IC 52 have write driver functions for applying write currents with polarities varying in accordance with data from the channel IC 53 to the respective magnetic head elements $50_1$–$50_n$, and read preamplifier functions for amplifying read-out data voltage from the magnetic head elements $50_1$–$50_n$ and for providing the amplified voltage to the channel IC 53. The first head ICs $51_1$–$51_n$ mainly operate as final stages of the write driver functions and first stages of the read preamplifier functions. The second head IC 52 mainly operates as amplifier stages next to the final driver stages and to the first preamplifier stages.

The channel IC 53 transfers the read-out data to the external circuits through the HDD controller 54 and receives the write data from the external circuits through the HDD controller 54. The HDD controller 54 sends commands for selection of the read or write mode of the magnetic head elements $50_1$–$50_n$ and for halt control of the write current which will be described later to the second head IC 52.

In this embodiment, after continuous application of the write current to each of the magnetic head elements $50_1$–$50_n$ for a predetermined write period of time which will be determined within 3 msec to 1 sec, the write current is forcibly stopped from application for a predetermined period (predetermined write halt period) equal to or longer than the predetermined write period even if there exists data to be written. In addition to the aforementioned air flow cooling, by executing this write halt control, the first head ICs $51_1$–$51_n$ which are heated by the write current can be effectively cooled.

The write halt control can be done either by forcibly stopping both the write and read operations of the magnetic head element during the write halt period, or by forcibly stopping only the write operation of the magnetic head element but executing the read operation of this magnetic head element during the write halt period. In the latter case, effective utilization of the magnetic disk unit can be attained.

As aforementioned, the write period and the write halt period are alternately repeated for the same magnetic head element. In case of the magnetic disk unit with a plurality of the magnetic head elements, it is desired that during the write period, the write current is applied to one magnetic head element such as the magnetic head element $50_1$, and just after the write period, the write current is sequentially applied to another magnetic head element such as the magnetic head element $50_2$. Of course, after the write period, the write current to the magnetic head element $50_1$ should be stopped from application for the write halt period. Instead of executing the write operation of the magnetic head element $50_2$, another operation such as read operation from this magnetic head element $50_2$ may be executed just after the write period of the previous head element $50_1$. According to this control method, since at least one magnetic head element in the magnetic disk unit is always operating, effective utilization of the magnetic disk unit can be also attained.

It is desired that the write period is determined by using a unit of time that substantially corresponds to one rotation of the magnetic disk in operation. For example, since one rotation time of the magnetic disk rotating at 7,200 rpm is about 8.3 msec, the write period is determined to 8.3 msec. or to a convenient value near 8.3 msec such as 7.5 msec. The write halt period is determined to a value equal to or longer than the write period, for example, to 10 msec or more such as 20 msec.

Figure 6:
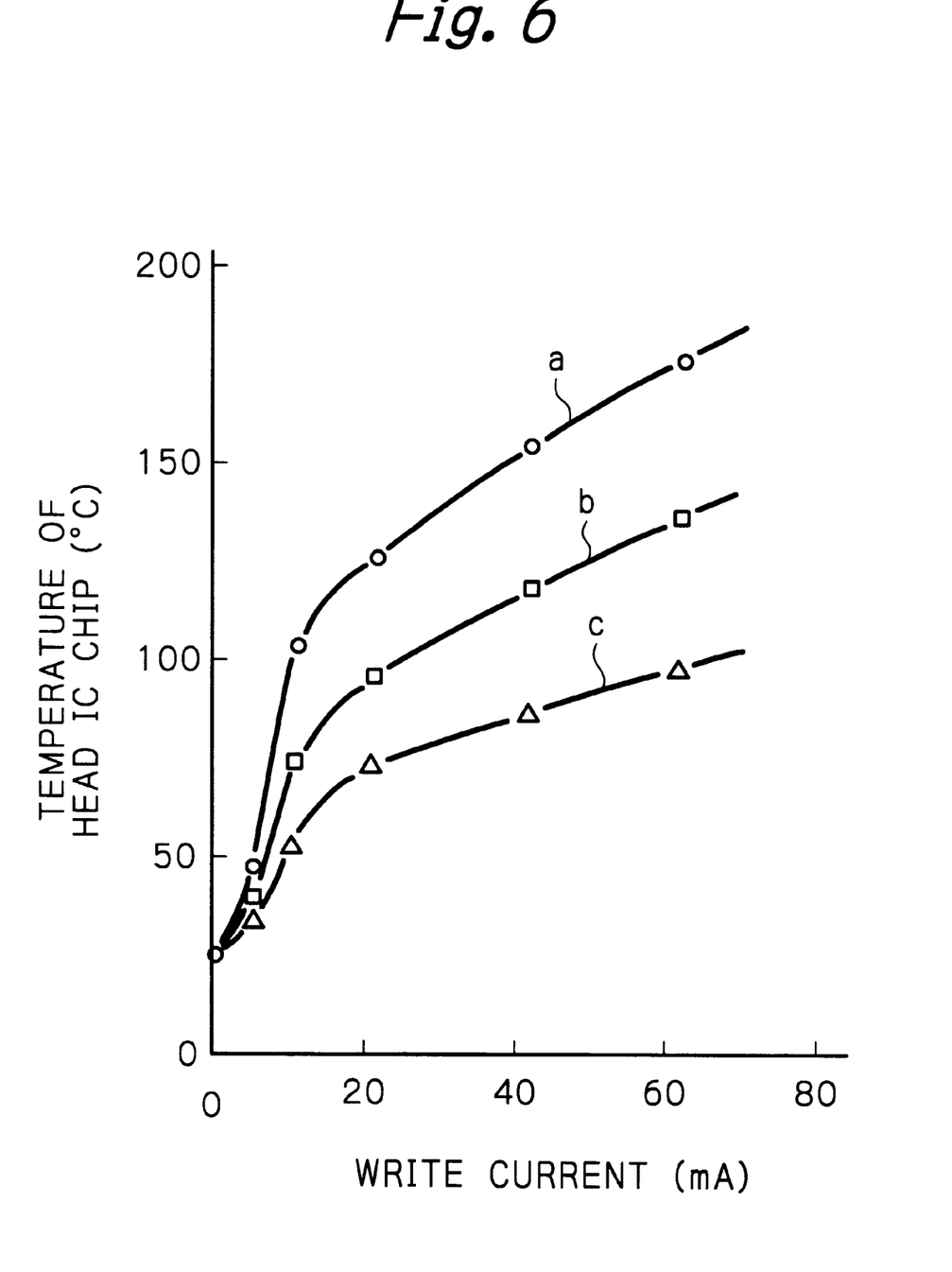
FIG. 6 is a graph illustrating temperature characteristics of the head IC chip versus write current in the conventional magnetic disk unit and in the magnetic disk unit with write halt periods according to the present invention.

FIG. 6 illustrates measured temperature characteristics of the head IC chip versus the write current in the conventional magnetic disk unit and in the magnetic disk unit with write halt periods according to the present invention.

The measurement was done under the condition of rotating the magnetic disk at 6,000 rpm. The head IC chip during this measurement was attached at a position with no influence of airflow due to the rotation of the magnetic disk.

In the figure, "a" represents measured characteristics according to the conventional art in case that the write current is continuously applied without any write halt period. As will be noted, the temperature of the head IC chip exceeds 150° C. under application of normally used write current of 40 mA. Therefore, it is impossible to actually use this configuration wherein the head IC chip is mounted at a position with no influence of air flow due to the rotation of the magnetic disk and the write current is continuously applied to the head IC chip without any write halt period.

In the figure, also, "b" represents measured characteristics according to the present invention in case that the write period of 10 msec and the write halt period of 10 msec are alternately repeated. As will be noted, since the temperature of the head IC chip never exceed 150° C., it is possible to actually use this configuration.

In the figure, furthermore, "c" represents measured characteristics according to the present invention in case that the write period of 10 msec and the write halt period of 20 msec are alternately repeated. Since the temperature of the head IC chip further lowers, it is possible to actually and effectively use this configuration.

Figure 7:
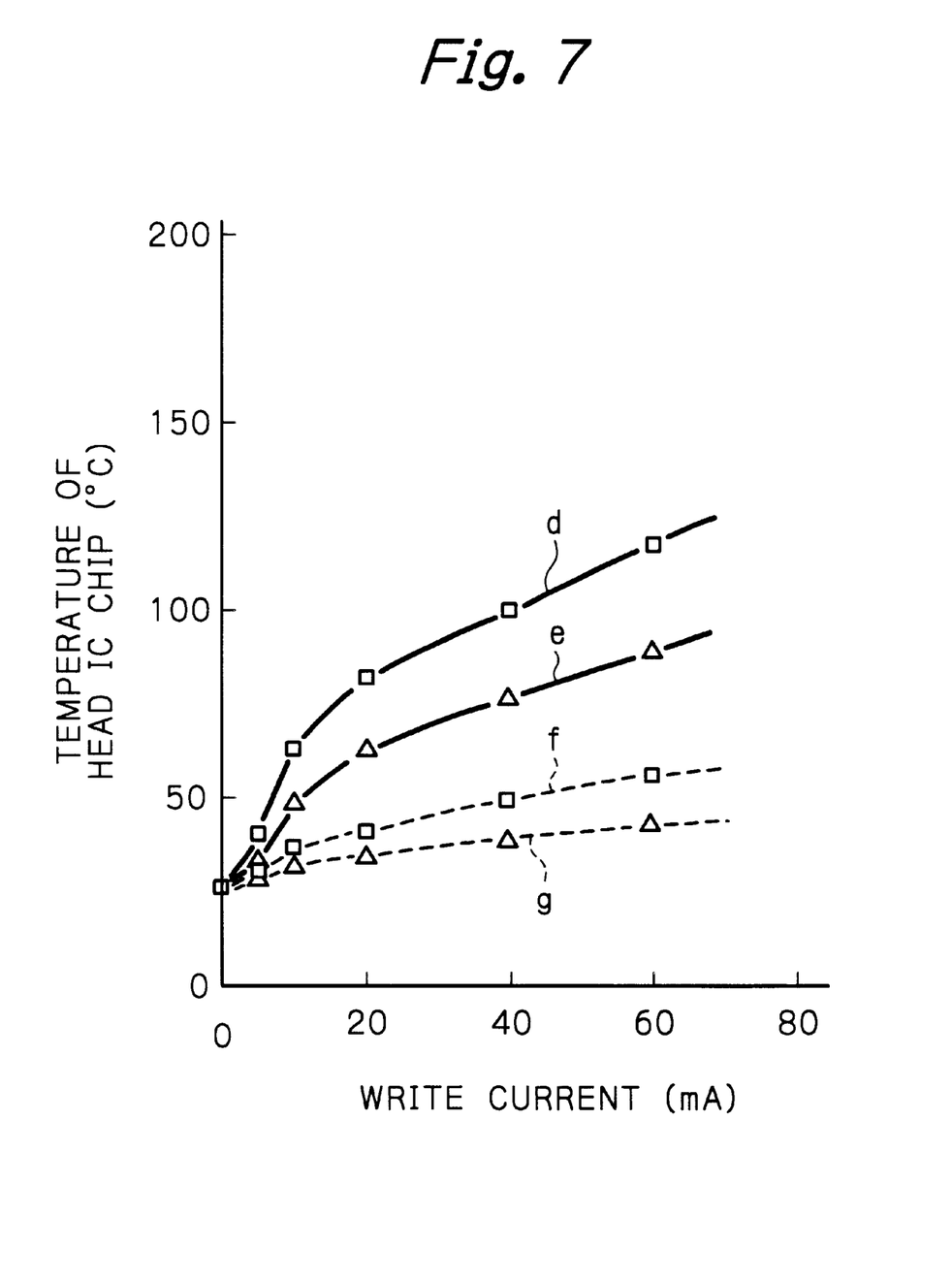
FIG. 7 is a graph illustrating temperature characteristics of the head IC chip versus write current in the magnetic disk unit shown in FIG. 1.

FIG. 7 illustrates measured temperature characteristics of the head IC chip versus the write current in the magnetic disk unit of the embodiment shown in FIG. 1. In the embodiment, as mentioned before, the head IC chip 20 is attached so as to always receive airflow due to the rotation of the magnetic disk 10 in operation.

In the figure, "d" represents measured characteristics in case that the distance D between the head IC chip 20 and the surface of the magnetic disk 10 is set as D=800 μm, and that the write period of 10 msec and the write halt period of 10 msec are alternately repeated. As will be noted, the temperature of the head IC chip never exceed 150° C.

In the figure, also, "e" represents measured characteristics in case that the distance D is set as D=800 μm, and that the write period of 10 msec and the write halt period of 20 msec are alternately repeated. As will be noted, the temperature of the head IC chip further lowers.

The temperature curves "d" and "e" shown in FIG. 7 are lower than the curves "b" and "c" shown in FIG. 6 over the whole range. Thus, it is understood that the cooling caused by airflow in addition to the cooling caused by the write halt control is very effective.

In FIG. 7, "f" represents measured characteristics in case that the distance D is set as D=100 μm, and that the write period of 10 msec and the write halt period of 10 msec are alternately repeated, furthermore "g" represents measured characteristics in case that the distance D is set as D=100 μm, and that the write period of 10 msec and the write halt period of 20 msec are alternately repeated. As mentioned before, the shorter in the distance D, the more effective airflow cooling of the head IC chip 20 due to disk rotation can be realized. However, the distance D should be determined so that, in operation, the head IC chip 20 or the slider 18 does not contact with the surface of the magnetic disk 10.

In the aforementioned embodiment, the slider 18 itself is cooled by air flow due to the disk rotation resulting the temperature of the magnetic head element to prevent from greatly increasing.

Figure 8:
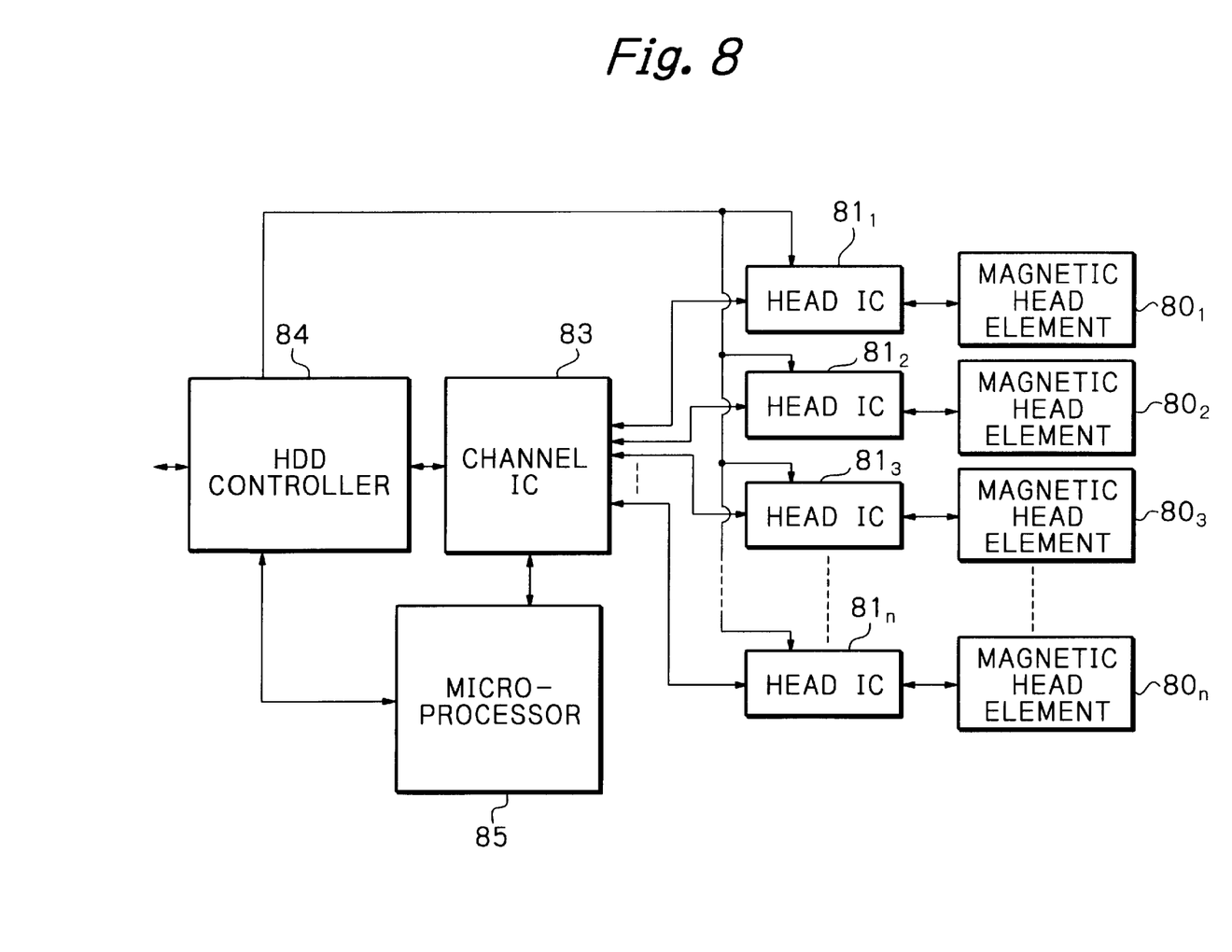
FIG. 8 is a block diagram illustrating another example of electrical structure of the magnetic disk unit shown in FIG. 1.

FIG. 8 illustrates an example of electrical structure of the magnetic disk unit in another embodiment according to the present invention.

In the figure, reference numerals $80_1$–$80_n$ denote read and write magnetic head elements mounted on the respective head suspension assemblies 17, $81_1$–$81_n$ denote head ICs mounted on the suspensions 18 of the respective head suspension assemblies 17 and connected to the respective magnetic head elements $80_1$–$80_n$, 83 denotes a channel IC mounted on a main board in the magnetic disk unit and connected to the head ICs $81_1$–$81_n$ via the FPC 21, 84 denotes a HDD controller to be connected with external circuits via a bus and used for selection control of write/read modes of the magnetic head elements, and 85 denotes a microprocessor for controlling the above-mentioned circuits. Although it is not shown in FIG. 8, a spindle motor for rotating the magnetic disks 10, a driving control circuit of the spindle motor, a driving control circuit of the actuator or VCM 15, and memories are also mounted in the typical magnetic disk unit.

The head ICs $81_1$–$81_n$ have write driver functions for applying write currents with polarities varying in accordance with data from the channel IC 83 to the respective magnetic head elements $80_1$–$80_n$, and read preamplifier functions for amplifying read-out data voltage from the magnetic head elements $80_1$–$80_n$ and for providing the amplified voltage to the channel IC 83.

The channel IC 83 transfers the read-out data to the external circuits through the HDD controller 84 and receives the write data from the external circuits through the HDD controller 84. The HDD controller 84 sends commands for selection of the read or write mode of the magnetic head elements $80_1$–$80_n$ and for halt control of the write current which will be described later to the head ICs $81_1$–$81_n$.

In this embodiment, after continuous application of the write current to each of the magnetic head elements $80_1$–$80_n$ for a predetermined write period of time which will be determined within 3 msec to 1 sec, the write current is forcibly stopped from application for a period (write halt period) equal to or longer than the predetermined write period even if there exists data to be written. In addition to the aforementioned air flow cooling, by executing this write halt control, the head ICs $81_1$–$81_n$ which are heated by the write current can be effectively cooled.

Figure 9:
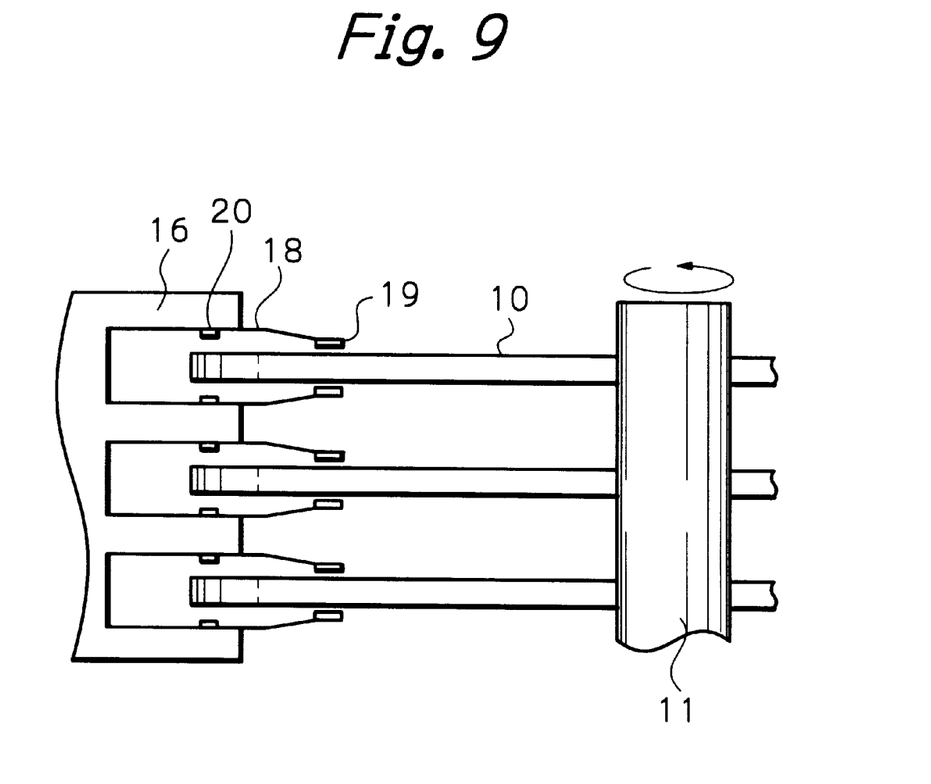
FIG. 9 is a side view illustrating the structure of an assembly carriage device in a magnetic disk unit of another embodiment according to the present invention.

FIG. 9 illustrates the structure of an assembly carriage device in the magnetic disk unit in this embodiment.

Figure 10:
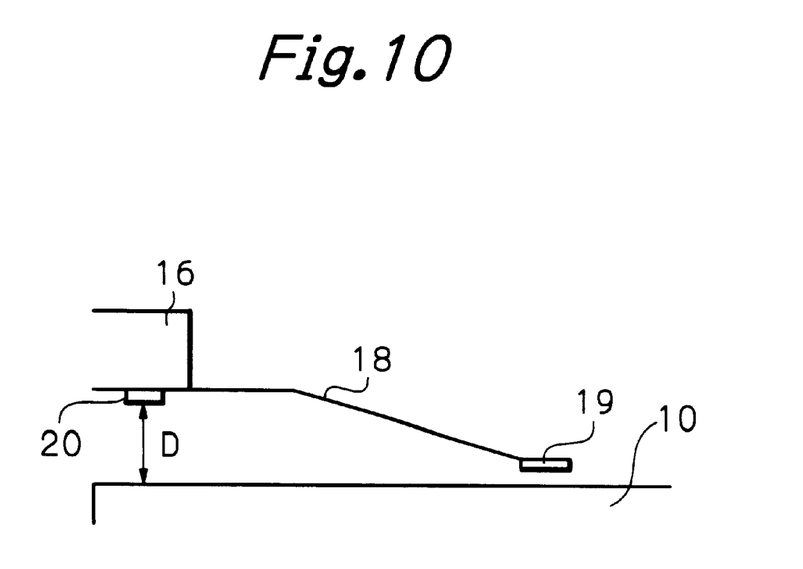
FIG. 10 illustrates a distance D between the surface of a magnetic disk and a head IC chip in the magnetic disk unit shown in FIG. 9.

In this embodiment, the head IC chips 20 are not mounted on the suspensions 18 but are respectively mounted on connection line members such as the FPCs 21 connected to the inner circuit in the magnetic disk unit. However, it is important that each of the head IC chips 20 is mounted on the FPC 21 so as to locate within the peripheral edge of the magnetic disk 10 in operation. The connection line member such as FPC 21 and thus the head IC chip 20 may be fixed to the drive arm 16 as shown in FIGS. 9 and 10 or separated from the drive arm 16.

Since the head IC chip 20 is mounted on the connection line member in operation, airflow due to rotation of the magnetic disk 10 passes near the head IC chip 20. Thus, this head IC chip 20 is always cooled while the magnetic head element seeks above the surface of the magnetic disk resulting to prevent its temperature from greatly increasing.

Similar to that in the embodiment of FIG. 1, after continuous application of the write current to each of the magnetic head elements for a predetermined write period of time, the write current is forcibly stopped from application for a write halt period equal to or longer than the predetermined write period even if there exists data to be written. In addition to the air flow cooling, by executing this write halt control, the head IC chips 20 which are heated by the write current can be effectively cooled to extremely reduce its temperature increasing.

Another constitutions, operations and advantages in this embodiment are substantially the same as those in the embodiment of FIG. 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magnetic disk unit comprising:
    slider suspension assemblies, each of said assemblies including a slider with at least one magnetic head element and a suspension having one end portion and one surface, said slider being mounted on said one surface of said suspension at said one end portion;
    magnetic disks, each of said disks having at least one surface which opposes to said slider of said assembly;
    head IC chips electrically connected to said magnetic head elements; and
    a control circuit electrically connected with said head IC chips for controlling operations of each of said head IC chips so that a write current is applied from one head IC chip to one magnetic head element for a first predetermined period of time and application of the write current from one head IC chip to said one magnetic head element is stopped for a second predetermined period of time equal to or longer than said first predetermined period to cool said one head IC chip connected to said one magnetic head element, said first predetermined period and said second predetermined period being alternately repeated.

2. The unit as claimed in claim 1, wherein a read operation of said magnetic head element is executed during said second predetermined period.

3. The unit as claimed in claim 1, wherein said first predetermined period is determined by using a unit of time which substantially corresponds to one rotation of said magnetic disks.

4. The unit as claimed in claim 1, wherein said control circuit controls the first and second predetermined periods with respect to the write current applied to the same magnetic head element.

5. The unit as claimed in claim 1, wherein said control circuit controls the first and second predetermined periods with respect to the write current applied to a plurality of the magnetic head elements.

6. The unit as claimed in claim 5, wherein said control circuit controls the write current applied to said magnetic head elements so that the write current is sequentially applied to each of the magnetic head elements for the first predetermined period.

7. The unit as claimed in claim 1, wherein said head IC chips are mounted at positions where air flow produced by rotation of said magnetic disks are always provided during operation.

8. The unit as claimed in claim 7, wherein said head IC chips are mounted at positions within peripheral edges of said magnetic disks so as to oppose to surfaces of said magnetic disks, respectively.

9. The unit as claimed in claim 8, wherein a distance between each of said head IC chips and each of the opposing surfaces of said magnetic disks is equal to or shorter than 1,000 μm.

10. The unit as claimed in claim 7, wherein said magnetic disk unit has connection line members for connecting said head IC chips with external circuits, and wherein said head IC chips are mounted on said connection line members, respectively.

11. A magnetic disk unit comprising:

slider suspension assemblies, each of said assemblies including a slider with at least one magnetic head element and a suspension having one end portion and one surface, said slider being mounted on said one surface of said suspension at said one end portion;

magnetic disks, each of said disks having at least one surface which opposes to said slider of said assembly;

head IC chips electrically connected to said magnetic head elements; and a control circuit electrically connected with said head IC chips for controlling operations of each of said magnetic head elements so that a write current is applied to one magnetic head element at one slider for a first predetermined period of time and application of the write current to said one magnetic head element is stopped for a second predetermined period of time equal to or longer than said first predetermined period, a write or read operation being executed at another magnetic head element at another slider during said second predetermined period.

* * * * *